(12) United States Patent
Schmitt et al.

(10) Patent No.: US 8,228,488 B2
(45) Date of Patent: Jul. 24, 2012

(54) METHOD AND APPARATUS FOR THICKNESS MEASUREMENT

(75) Inventors: Peter Schmitt, Erlangen (DE); Guenther Kostka, Erlangen (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 240 days.

(21) Appl. No.: 12/516,012

(22) PCT Filed: Dec. 6, 2007

(86) PCT No.: PCT/EP2007/010612
§ 371 (c)(1),
(2), (4) Date: Jul. 2, 2009

(87) PCT Pub. No.: WO2008/071337
PCT Pub. Date: Jun. 19, 2008

(65) Prior Publication Data
US 2010/0214555 A1    Aug. 26, 2010

(30) Foreign Application Priority Data
Dec. 15, 2006 (DE) .................. 10 2006 059 415

(51) Int. Cl.
*G01N 21/00* (2006.01)
(52) U.S. Cl. .......................................... 356/72; 378/54
(58) Field of Classification Search ................ 356/630, 356/631, 72–73; 378/54
See application file for complete search history.

(56) References Cited

U.S. PATENT DOCUMENTS

| | | |
|---|---|---|
| 3,187,185 A | 6/1965 | Milnes |
| 4,564,296 A | 1/1986 | Oshida et al. |
| 4,773,760 A | 9/1988 | Makkonen |
| 4,803,371 A | 2/1989 | Durland |
| 5,247,560 A * | 9/1993 | Hosokawa et al. ............. 378/54 |
| 5,485,082 A | 1/1996 | Wisspeintner et al. |
| 5,905,576 A | 5/1999 | Takada et al. |
| 6,281,679 B1 | 8/2001 | King et al. |
| 6,480,802 B1 | 11/2002 | Flormann |
| 6,967,726 B2 | 11/2005 | King et al. |
| 8,067,072 B2 * | 11/2011 | Tan .............................. 428/35.7 |
| 2003/0007161 A1 * | 1/2003 | Bowles ......................... 356/630 |

(Continued)

FOREIGN PATENT DOCUMENTS

CA    2 070 822 A1    6/1991

(Continued)

OTHER PUBLICATIONS

Official Communication issued in corresponding International Patent Application No. PCT/EP2007/010612, mailed on Jul. 30, 2009.

(Continued)

*Primary Examiner* — Kara E Geisel
(74) *Attorney, Agent, or Firm* — Keating & Bennett, LLP (57) ABSTRACT

The material strength of extensive objects can be determined efficiently by using two distance measurers, wherein a first distance measurer determines the distance to a first main surface of the object and a second distance measurer determines the distance to a second main surface object opposing the first main surface. If potential measurement errors due to the extensive geometry are avoided by determining a reference distance between the first distance measurer and the second distance measurer by a reference unit via X-radiation, the thickness of the object between the first main surface and the second main surface can be determined with high accuracy and velocity.

12 Claims, 6 Drawing Sheets

U.S. PATENT DOCUMENTS

2007/0280415 A1 * 12/2007 Waterson .................. 378/55

FOREIGN PATENT DOCUMENTS

| DE | 36 42 377 A1 | 11/1987 |
|---|---|---|
| DE | 40 11 717 C2 | 10/1991 |
| DE | 42 20 501 A1 | 1/1994 |
| DE | 197 57 716 A1 | 7/1998 |
| DE | 197 33 297 A1 | 2/1999 |
| DE | 100 60 144 A1 | 6/2002 |
| FR | 1 312 164 A | 12/1962 |
| GB | 2 046 900 A | 11/1980 |
| JP | 60-164202 A | 8/1985 |
| JP | 4-273010 A | 9/1992 |
| JP | 5-502720 A | 5/1993 |
| JP | 7-4931 A | 1/1995 |
| JP | 2000-292132 A | 10/2000 |
| JP | 2001-4350 A | 1/2001 |
| JP | 2004-037253 A | 2/2004 |
| JP | 2005-83820 A | 3/2005 |
| WO | 91/08439 A1 | 6/1991 |

OTHER PUBLICATIONS

Official Communication issued in International Patent Application No. PCT/EP2007/010612, mailed on Mar. 17, 2008.
Cielo: "Optical Sensors for On-Line Inspection of Industrial Materials," Optical Engineering; vol. 32; No. 9; Sep. 1993; pp. 2130-2137.
Schmitt et al.; "Method and Apparatus for Thickness Measurement"; U.S. Appl. No. 12/517,396, filed Jun. 3, 2009.
Official Communication issued in corresponding Japanese Patent Application No. 2009-540631, mailed on Jun. 21, 2011.

* cited by examiner

METHOD AND APPARATUS FOR THICKNESS MEASUREMENT

The present invention relates to the thickness measurement of extensive geometrical objects and, in particular, to how the thickness of materials produced in webs, such as sheet metals, files or paper can be determined efficiently.

BACKGROUND OF THE INVENTION

In thickness measurement of geometrically extensive objects, a number of problems arises, in particular when, such as in industrially-preprocessed sheets, the thickness of the objects to be tested can vary in a wide range, such as from 0.01 mm to several centimeters. If the geometrical extension in relation to the thickness of the objects is large or, in one direction, even approximately infinite, such as in materials, such as foils, paper or sheet metals wound on rollers, the problem exists that the thickness of a large area of the object has to be determined with a single measurement for keeping the overall measurement period at an acceptable level. Additionally, the problem arises that, in particular with materials produced in the form of webs, the demand for the tolerance of the thickness of the web is typically particularly high. For example, in automotive engineering, the sheet metal strengths are partly specified with extremely low tolerances, since maintaining the sheet metal strength is significant for the crash behavior of the finished vehicles. Additionally, when controlling sheet metal thicknesses, it also has to be considered that sheet metals are typically produced with high velocity in rolling mills, so that a large sheet metal area has to be tested per time unit. Among others, industrial rolling machines are used that can generate sheet metals with a width of up to 3 meters. Additionally, the sheet metal consists of a material that is opaque for conventional optical radiation, which additionally impedes measurement of sheet metal strength. Tactile methods that can determine the thickness of the sheet metal in a spatially resolved manner by directly contacting the surface of the same, can hardly be used for such a purpose, since the same would have to mechanically detect a plurality of measurement points, which would increase the effort and thus, the cost for the quality control significantly. In industrial production methods, sheet metals are frequently generated so fast that the same exit at the output of a rolling apparatus with such high speeds that these sheet metals vibrate in a direction perpendicular to the surface. In such cases, the usage of tactile methods is, in principle, not possible. Similar considerations apply, apart from sheet metals, to a plurality of other planar materials, such as foils, paper, glasses or similar elements, which require specific material strength control with high accuracy.

Due to the problems outlined above, monitoring the wall strength during production is extremely expensive, with sheet metals it is generally performed radiometrically, i.e. by using radio-active sources or X-ray tubes for generating X-radiation and detectors sensitive to radio-active rays or X-rays, respectively. Thereby, the material to be tested is screened with X-radiation or gamma radiation and the wall strength of the screened material is determined by the ray attenuation caused by absorption of the radiation in the material to be tested. Therefore, the ray intensity or the original ray intensity, respectively, has to be known and the ray intensity remaining after screening the material has to be detected by appropriate detectors. Radiation-sensitive detectors are generally very expensive apparatuses. Currently, for example, normally counting tubes are used, which means detector tubes filled with gas and provided with high voltage, since the same are relatively long-term stable and show little drift (for example, temperature-induced). When monitoring the production of broad sheet metals, sometimes up to 100 of such detectors, and possibly several X-ray sources, have to be used for obtaining the required spatial resolution or sensitivity, respectively, of the thickness measurement across the whole width of the sheet metals that are up to 3 meters wide. Here, realistically obtainable measurement accuracies are in the range of 0.1% of the wall thickness, which means approximately 10 μm in sheet metals of 10 mm. An obvious disadvantage is the high costs induced by such a measuring apparatus. For example, a high-voltage channel of a high-voltage supply and a read-out or evaluation channel, respectively, of a signal processing electronic has to be provided for every counting tube.

A further disadvantage is that the obtainable measurement accuracy is determined by the statistics of X-radiation (Poisson statistics). Thus, the signal to noise ratio is determined by the square root of the detected X-ray quanta. With the given available measurement time, the spatial resolution or the thickness sensitivity, respectively, is limited. Although basically the measurement accuracy can be increased by a longer measurement period or integration time, respectively, this is not arbitrarily possible in industrial scale, since the material coming out of a production line has to be tested within a limited period of time. The basically possible activity increase of the used X-ray sources also increases the risk in a radiation accident and can, thus, only contribute in a limited manner to increasing the measurement speed or the obtainable measurement accuracy, respectively.

Additionally, for the usage in connection with extensive materials, such as sheet metal rolls, the X-ray method is only partly suitable, since the typical commercial detectors (counting tubes) have an extension of merely several centimeters, so that, as has already been mentioned above, a plurality of such detectors has to be used. Additionally, the obtainable spatial resolution is heavily limited by the finite extension of the counting tubes, since an individual counting tube can only detect the existence of a gamma quantum in the area covered by the same, wherein a further differentiation of the location of the gamma quantum within the counting tube is not possible.

The conventional X-ray methods have the disadvantage that they can obtain only a limited spatial resolution and that they use detectors, whose acquisition and operation is extremely complex and cost-intensive.

The British patent application GB 2 046 900 describes how the thickness of a fabric can be determined, wherein both opto-electronic sensors and X-ray sensors are used. Thereby, point-shaped opto-electronic distances sensors as well as point-shaped X-ray sensors are used. A thickness measurement signal of the X-ray sensor is corrected with a control signal of the opto-electronic thickness sensor.

The Japanese patent application JP 2004-037253 describes a method how the measurement accuracy of an opto-electronic distance sensor can be improved by one-dimensional opto-electronic and X-ray sensors when thermal influences causing a long-term drift of the opto-electronically determined distance or thickness signal of an object under test are corrected by the thickness signals of the X-ray sensor.

The international patent application WO 91/08439 describes a light-slit measurement method by which the surface outline of extensive three-dimensional objects can be determined. For increasing the measurement accuracy, WO 91/08439 suggests measuring a calibration object of known geometrical extension in cyclic intervals with the light-slit sensor or the light-slit system, respectively, for performing calibration of the system.

SUMMARY

According to an embodiment, a measuring apparatus for determining the material strength of an object may have: a first distance measuring means for determining a first distance between the first distance measuring means and a first main surface of the object facing the first distance measuring means in measurement direction; a second distance measuring means for determining a second distance between the second distance measuring means and a second main surface of the object opposing the first main surface in measurement direction; a first X-ray means arranged in a spatially stationary orientation and known geometrical position with regard to the first and the second distance measuring means for inferring a first material strength of the object along the X-ray direction from an attenuation of X-radiation caused by the object along an X-ray direction; a second X-ray means connected to the first and the second distance measuring means and arranged in a further spatially stationary orientation for inferring a second material strength of the object along the second X-ray direction from an attenuation of X-radiation caused by the object along a second X-ray direction; and an evaluation means for determining the material strength of the object between the first main surface and the second main surface by using the first distance, the second distance and the first material strength, wherein the evaluation means is implemented to infer a relative spatial arrangement, in particular a tilting, between the first and the second distance measuring means from the first and second material strengths.

According to another embodiment, a method for determining the material strength of an object may have the steps of: determining a first distance between a first distance measuring means and a first main surface of the object facing the first distance measuring means in measurement direction; determining a second distance between a second distance measuring means and a second main surface of the object opposing the first main surface in measurement direction; determining a first material strength of the object from an attenuation of X-radiation in the X-ray direction caused along an X-ray direction by the object; determining a second material strength of the object from an attenuation of X-radiation in the second X-ray direction differing from the first X-ray direction caused along a second X-ray direction by the object; determining a relative spatial arrangement, in particular a tilting, between the first and the second distance measuring means from the first and second material strengths; and determining the material strength of the object in measurement direction between the first main surface and the second main surface by using the first distance, the second distance and the determined relative spatial arrangement between the first and the second distance measuring means.

The present invention is based on the knowledge that the material strength of extensive objects can be determined efficiently by using two distance measuring means, wherein a first distance measuring means determines the distance to a first main surface of the object and a second distance measuring means determines the distance to a second main surface of the object opposing the first main surface. If potential measurement errors due to the extensive geometry are avoided by the fact that a reference means determines a reference distance between the first distance measuring means and the second distance measuring means, the thickness of the object between the first main surface and the second main surface can be determined with high accuracy and velocity.

Thereby, detectors or distance measuring means are used that can determine the distance to an extensive area on the surface of the object by a single measurement. This is, for example, possible when applying the light-slit method.

In other words, it is the basic idea of the invention to determine the thickness of a web material by determining the distance from the upper and lower side of the web material to a detector arranged above or below, respectively, the web material, which allows, for example, a linear measurement of the distance. Suitable for this is, for example, the light-slit method. The problem of surface measurement of extensive objects is generally that due to the extension (for example, the large width of web materials), a mechanical structure for suspending the detectors above and below the object (web material) is required. Due to the large geometrical extension, it cannot be ensured that vibrations or thermal deformations do not corrupt the measurement result, in particular, since high-precision measurements in the range of several micrometers are to be performed. Such vibrations or deformations can, thus, cause a measurement error outside the normally required tolerances. According to this invention, this problem is solved by using a reference means for determining a reference distance between the first distance measuring means and the second distance measuring means. Thereby, a possible change of the distance of the two detector means above or below, respectively, the web material as well as, additionally, optionally possible tilting of one or several measurement heads perpendicular to the measurement direction is avoided. If, for example, web material is measured, such tilting along the advance direction of the produced web material could cause an additional measurement error, which can be corrected according to the invention.

Thus, in one embodiment of the present invention, a first light-slit measuring means is used for determining a first distance between the first light-slit measuring means and the first main surface of a web material to be measured. A second light-slit measuring means is used for determining a second distance from the second light-slit measuring means to a second main surface of the web material opposing the first main surface of the web material. The distance from the first light-slit measuring means to the second light-slit measuring means in the measurement direction is determined additionally as a reference distance by a reference means. Here, the measurement direction is the direction running parallel to the thickness of the object, which means perpendicular to the main surfaces.

According to an embodiment of the present invention, the measuring means is used for checking the thicknesses of sheet metals produced by a press immediately after their production. Therefore, the sheet metals are moved in an advance direction between the first light-slit measuring means and the second light-slit measuring means.

Here, the great advantage of using contactless light-slit measuring means is that the distance of the web material or the sheet metal web to the measurement head can be linearly detected across a width of more than 1 m by a single measurement. This means, with only a single measurement, a height profile perpendicular to the advance direction can be obtained, which describes more than 1 m of material width. Here, additionally, the spatial resolution is heavily increased compared to radiation detectors in that the geometrical extension of the projected light strip limiting the resolution in the advance direction can, in principle, be made as small as desired in the advance direction. By varying the advance speed of the sheet metal material coming out of the press, the spatial resolution of the topography information, which means the height information on the surface of the material to be tested or the thickness profile, respectively, can be varied in any way.

In one embodiment of the present invention, a radiation detector is used as reference means for determining the reference distance between the first and the second light-slit measuring means or between the first and the second distance measuring means, respectively. Thereby, the radiation detector determines, for a position on the surface of the object to be tested, the material strength of the same by measuring the radiation intensity lost by absorption. According to the invention, a distance measurement of the surface area to the light-slit measuring means is performed in the same surface area by the first and the second light-slit measuring means. Based on the radio-metrically determined thickness of the object to be tested in a small geometrical area and the measurement of the distances of the light-slit measuring means to exactly this area, the exact distance of the first and second light-slit measuring means can be determined with high accuracy as reference distance. Any thermally or mechanically induced distance variations can, thus, be compensated with high precision.

Here, it is a great advantage of the above-described embodiment of the present invention that contrary to conventional approaches, complex and cost-intensive radiometric distance measurement methods only have to be used for a limited area on the surface of the object to be tested or once per distance measuring means, respectively. Thereby, the costs can be significantly reduced. Apart from this, for the above-mentioned reasons, the obtainable spatial resolution of the thickness profile to be measured is significantly increased by the light-slit method.

In a further embodiment of the present invention, the obtainable measurement accuracy in the thickness direction can be additionally increased by performing a second radiometric measurement with an X-ray means, wherein the X-ray means is connected to the first light-slit measuring means and the second light-slit measuring means. If the measurement with the second X-ray means is performed along a different X-ray direction than with the first X-ray means, for example at another angle relative to the surface of the object to be tested, possible tilting or possible geometric misalignment, respectively, of the light slit-measuring means can be assumed. Thereby, advantageously, the measurement accuracy can be further increased by performing, in addition to the distance of the two light-slit measuring means, also a correction of erroneous relative orientation in a further dimension of the two light-slit measuring means to each other.

In an alternative to the invention, a reference object of predetermined known thickness is mounted on one or both sides of the web material to be measured or the object to be measured, respectively, so that the same is additionally measured by both light-slit measuring means together with the surface of the object to be measured. The light-slit measuring means have to be arranged such that part of the measuring light strip generated on the surface of the object by the light-slit measuring means is mapped onto the surfaces of the reference objects facing the light-slit measuring means.

Determining the reference distance can then be performed by determining the distance of the first and second light-slit measuring means to the surfaces of the reference object facing the same simultaneously with the distance to the object to be measured. Since the thickness of the reference object is exactly known, the distance between the first light-slit measuring means and the second light-slit measuring means can be calculated easily as reference distance. Thus, according to the invention, a material that is subject to a low thermal expansion is used for the reference objects.

As long as it is geometrically possible to detect respective reference objects simultaneously with the objects to be tested by the light-slit measuring means by simple insertion of cost-effective reference objects, maintaining the measurement accuracy can be ensured. Thus, the usage of expensive X-ray detectors can be fully omitted.

In a further alternative to the present invention, mounting reference objects on both sides of a web material to be tested additionally increases the obtainable measurement accuracy.

In summary, it can be said that the inventive method or the inventive apparatus, respectively, has the potential to obtain a higher spatial resolution and to increase the measurement velocity overall, wherein, at the same time, the cost of the used detectors can be significantly decreased compared to conventional solutions. This is obtained by supplementing radiometric detectors partly or completely by other measurement systems that can detect distances on a line or in an extensive geometrical area, such as light-slit methods.

Other features, elements, steps, characteristics and advantages of the present invention will become more apparent from the following detailed description of preferred embodiments of the present invention with reference to the attached drawings.

BRIEF DESCRIPTION OF THE DRAWINGS

Embodiments of the present invention will be detailed subsequently referring to the appended drawings, in which.

DETAILED DESCRIPTION OF THE INVENTION

Since the inventive concept will be discussed in the following sections by using light-slit measuring means, the light-slit measurement method will be described briefly based on a simple example with regard to FIG. 5.

Figure 5:
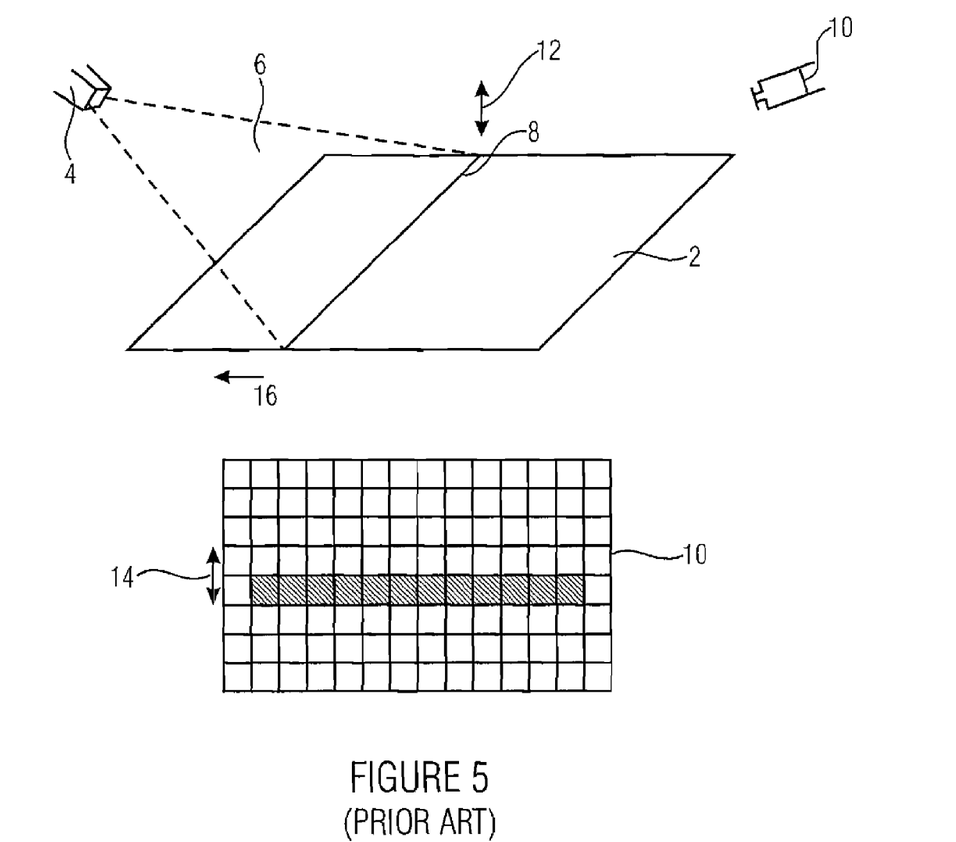
FIG. 5 is an alternative light-slit measurement method.

FIG. 5 shows the surface of an object to be measured 2, a measuring light projector 4 emitting light in a light plane 6, so that a measuring light strip 8 is generated on the surface of the object 2. In the simplified case of a perfectly plane surface 2 shown in FIG. 5, the measuring light strip 8 is the straight line shown in FIG. 5.

The measuring light strip 8 is recorded via an appropriate sensor 10. In the example shown in FIG. 5, the sensor 10 is a two-dimensional matrix sensor, such as a CCD or a CMOS sensor. The exact type of sensor is not significant for the mode of operation of the inventive concept, generally, other types of sensors can be used as well.

If a measuring light line 8 is generated on the surface 2 of the object as a straight line, the image of the straight line, as shown in FIG. 5, will be mapped on the sensor 10. The height information results from the geometry of the overall structure, in particular from the relative position of the sensor 10 and the measuring light projector 5. If, for example, the surface 2 of the object is moved in a direction 12, the measuring light strip is generated at another position on the surface 2 of the object, since the light plane 6 remains unaltered in space. Since the sensor 10 is also stationary, the image of the measuring light line (symbolized by black squares) will vary on the sensor in a direction 14. When the geometry of the light plane 6 and the sensor 10 is known, as is described above, the position of the surface 2 of the object in direction 12 can be inferred.

Equivalent considerations apply when the surface of the object is not plane. With the light-slit method shown in FIG. 5, topography information or height information, respectively, across the whole width of the surface 2 can be determined via a single pick-up of the sensor 10.

Sensors 10 specialized for light-slit measurement methods that can perform signal processing themselves at high speeds are used, so that the same merely provide, for example, the information about the brightest illuminated pixel of the sensor 10 as a measurement result. Such highly specialized sensors are thus particularly suited for fast measurement, since extensive signal post-processing, as it is required, for example, with conventional CCD, can be omitted.

In summary, light-slit measurement methods have the significant advantage that the height information along a spatially extensive measurement line 8 can be obtained with high velocity.

If the surface 2 is moved in a direction perpendicular to the measuring light line 8, and in a direction 16 below the light plane, and if pick-ups are performed successively by the sensor 10, the whole topography of the surface 2 of the device under test can be determined within a short time, which predestines the light-slit measurement method for the usage in measuring spatially extensive surfaces.

In the embodiments of the present invention described below, light-slit measurement methods are used for illustrating the inventive concept. However, with regard to its application, the inventive concept is in no way limited to the used light-slit measurement method. Rather, any other measurement methods that can measure the topography of a surface by distance measurement can be used according to the invention.

Figure 1:
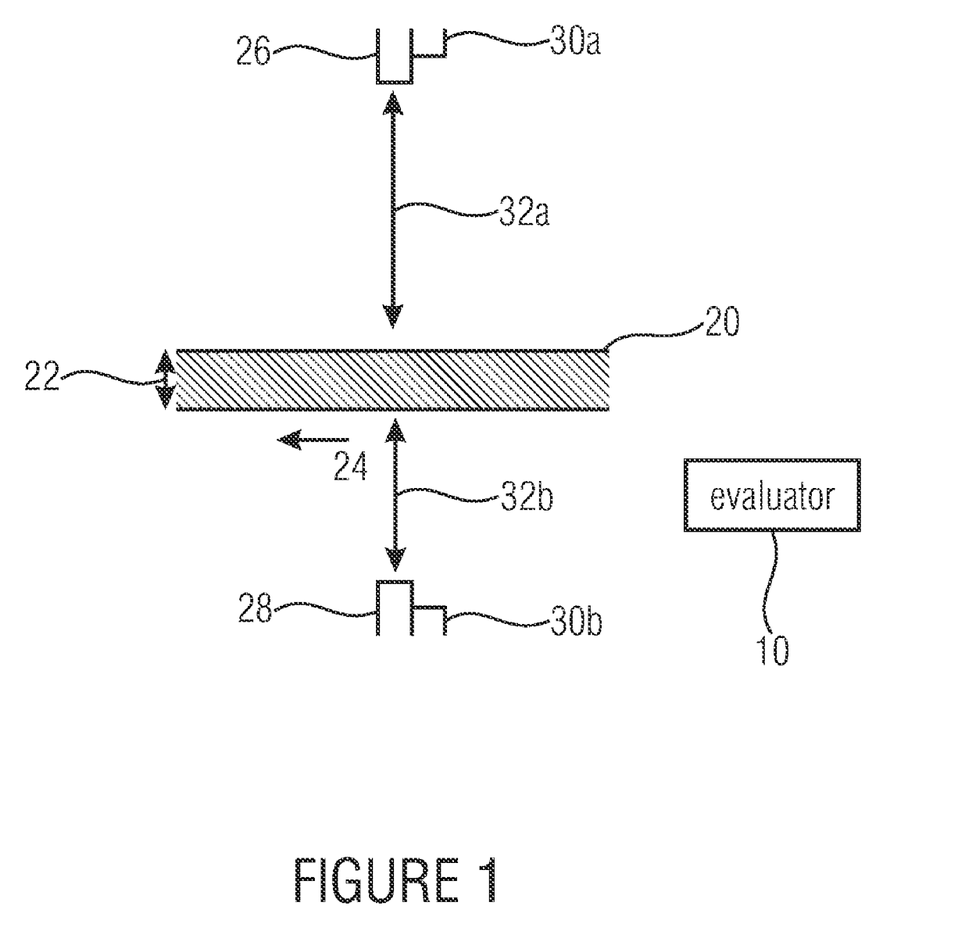
FIG. 1 is an alternative to the invention with simple radiometric determination of the reference distance.

FIG. 1 shows an embodiment of the present invention, wherein the reference distance is determined by radiometric measurement. FIG. 1 schematically shows, in a cut-away view, an object 20 to be measured, whose material strength 22($d$) is to be determined, wherein the object 20 can be moved in a direction 24 between a first distance measuring means 26 and a second distance measuring means 28. FIG. 1 additionally shows a reference means, comprising an X-ray source 30$a$ and an X-ray detector 30$b$, wherein the X-ray source 30$a$ is arranged with regard to the first distance measuring means 26 and the X-ray detector 30$b$ with regard to the second distance measuring means in a known geometrical position. This can also mean, for example, that the same are also connected in a mechanical manner. For the mode of operation of the inventive concept, it does not matter to which of the two distance measuring means the X-ray source 30$a$ is connected, according to the invention, a mirror-image configuration is also possible.

The first and second distance measuring means 26 or 28, respectively, are shown merely schematically in FIG. 1, just as the X-ray source 30$a$ and the X-ray detector 30$b$. The exact operating principle of the distance measuring means 26 or 28, respectively, is not significant for the application of the inventive concept. It is advantageous when the distance measuring means 26 and 28 can determine with one measurement, one distance to an extensive geometrical area on the surface of the object to be measured 20 associated with the same. This is, for example, the case in an inexpensive manner in the light-slit measuring means described with regard to FIG. 5. According to the invention, a first distance 32$a$ between a first main surface of the object 20 associated with the first distance measuring means 26 and the first distance measuring means 26 is determined. A second distance 32$b$ between the second distance measuring means 28 and a second main surface of the object 20 facing the second distance measuring means 28 is determined by the second distance measuring means 28.

The distance between the first and the second distance measuring means 26 and 28 can be determined as a reference distance by the X-ray source 30$a$ and the X-ray detector 30$b$. Alternatively, the thickness of the object in a selected geometrical area of the object can be determined as reference distance. Therefore, the X-ray detector 30$b$ determines the X-ray intensity emitted by the X-ray source 30$a$ attenuated by the material strength of the object to be measured 20. By knowing the absorption behavior of the material of the object 20, the thickness 22 of the object 20 can be inferred. According to the invention, X-ray source 30$a$ and X-ray detector 30$b$ are connected to one distance measuring means each, and the thickness 22 of the object 20 is determined by the X-ray measuring means at a position of the surface of the object 20, which is also detected by the distance measurement of the distance measuring means 26 and 28. According to the invention, the distance between the first and second distance measuring means can be calculated from the sum of the distances 32$a$, 32$b$ and the thickness 22 as reference distance.

This has the great advantage that the expensive X-ray technology only has to be used in a geometrically very limited part of the surface of the object 20 for determining the distance of the two distance measuring means from each other or to temporally track the same, respectively. The inventive high measurement accuracy of the material strength of the object can thus also be maintained with thermally or mechanically induced variations of the distance of the two distance measuring means 26 and 28.

Figure 2:
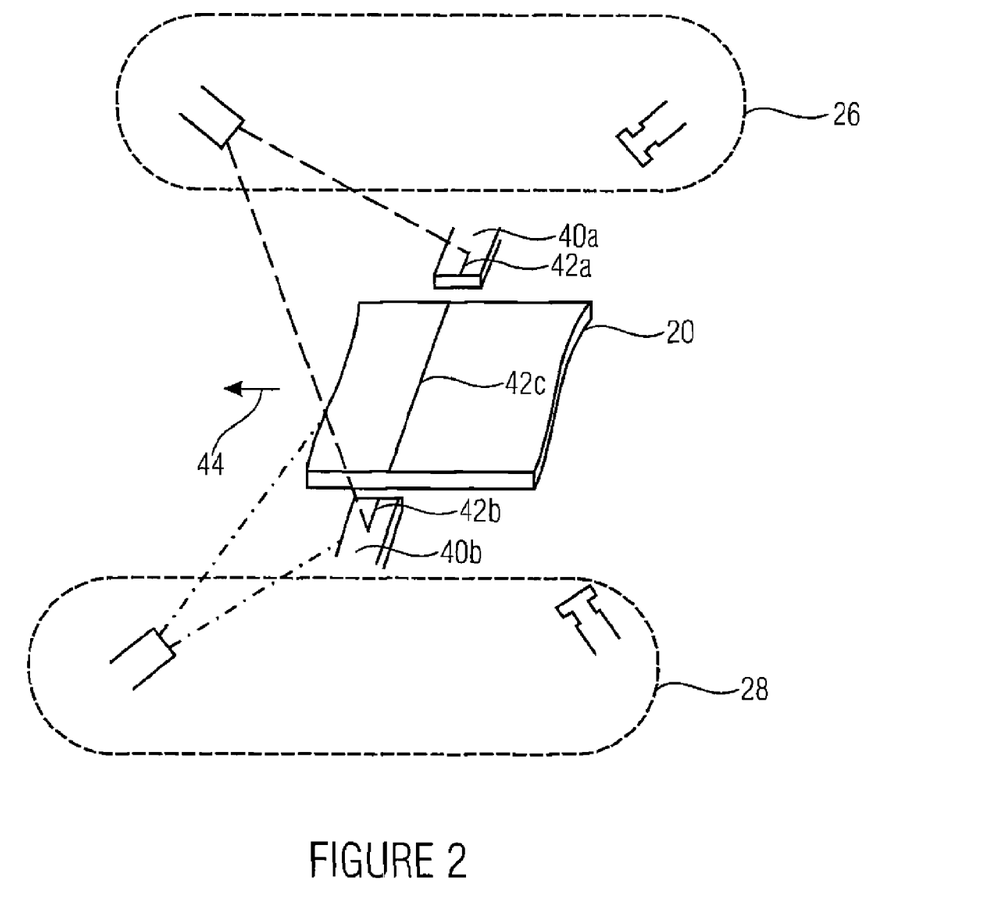
FIG. 2 is an alternative to the invention with reference objects for determining the reference distance.

FIG. 2 shows an alternative to the invention, where the reference distance is determined by optical measurement.

In FIG. 2 and the four following Figures, functionally similar or functionally identical components, respectively, are provided with the same reference numerals, so that the description of the individual components can be mutually applied to different Figures. Additionally, objects provided with identical reference numerals can be alternatively used within the individual embodiments described below.

FIG. 2 shows, as a first distance measuring means 26, a light-slit measuring means, as it has already been described with regard to FIG. 5. As a second distance measuring means 28, a light-slit measuring means is used as well. Additionally, FIG. 2 shows the object to be measured 20 in a perspective view, as well as a first reference object 40$a$ and a second reference object 40$b$. The reference objects 40$a$ and 40$b$ each have a first reference main surface facing the first distance measuring means 26 or the first light-slit measuring means 26, respectively. A second main surface of reference objects 40$a$ and 40$b$ is facing the second distance measuring means 28 or the second light-slit measuring means 28, respectively. The reference objects 40$a$ and 40$b$ are also distinguished by the fact that the same have a precise predetermined thickness between the reference main surfaces. Reference objects 40$a$ and 40$b$ are produced of materials subject to low thermal expansion.

As can be seen in FIG. 2, the geometrical arrangement of the light-slit measuring means 26 and 28 or the reference objects 40$a$ and 40$b$, respectively, is selected such that parts 42$a$ and 42$b$ of the measuring light strip generated by the first light-slit measuring means 26 are generated on reference objects 40a and 40b. The same applies for light-slit measuring means 28, wherein due to the partly perspective view in FIG. 2, the light measuring strips generated on the second main surfaces of reference objects 40a and 40b are not visible in FIG. 2.

In the alternative to the invention shown in FIG. 2, the reference means for determining a reference distance between the first light-slit measuring means 26 and the second light-slit measuring means 28 also comprises two reference objects 40a and 40b.

Since the thickness of the reference objects 40a and 40b is exactly known, and the distances to the reference objects 40a and 40b are each also determined during operation of the measuring means of FIG. 2, for example, the distance between the first light-slit measuring means 26 and the second light-slit measuring means 28 can be determined as a reference distance by connecting the distances of the light-slit measuring means 26 to the first main surface of the reference objects 40a and 40b, the thickness of the reference objects 40a and 40b as well as the distances of the second light-slit measuring means 28 to the second main surface of the reference objects 40a and 40b. Alternatively, the difference of the actual thickness of the reference objects to the thickness determined by the light-slit measuring means can be used as reference amount. By means of the difference, the thickness values determined by the light-slit measuring means could be corrected across the whole width of the measuring light strips.

Figure 6:
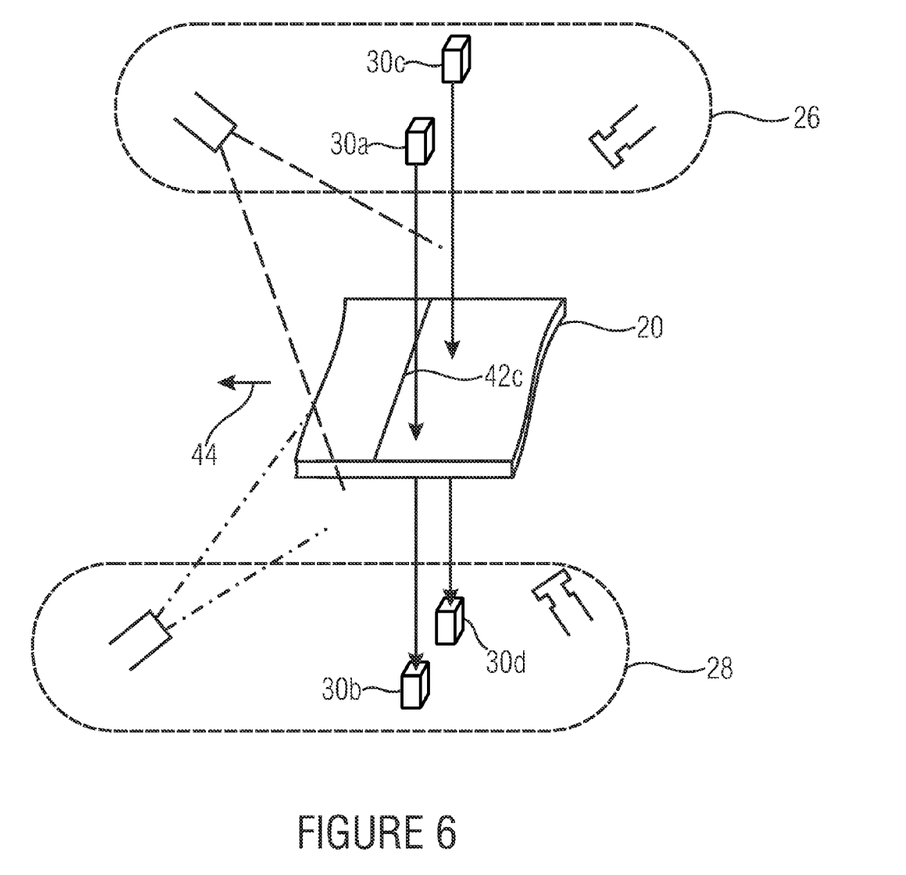
FIG. 6 is an alternative to the invention with reference objects for determining the reference distance.

Although the usage of two reference objects 40a and 40b in the example shown in FIG. 2 additionally increases the obtainable measurement accuracy compared to using a single reference object additionally, in a further example, merely one reference object can be used for determining a reference distance. On the other hand, referring to the embodiment of FIG. 1, a second X-ray unit comprising a source 30c and a detector 30d, may be connected to the first and the second distance measurers 26 and 28 and arranged in a further spatially stationary orientation for inferring a second material strength of the object 20 along the X-ray direction from an attenuation of X-radiation caused by the object 20, so that evaluation of tilting is possible using the two thickness values determined by the two X-ray units just as is done in the case of using the measurements of the reference objects 40a and 40b as described above. This alternative to FIG. 1 is shown in FIG. 6.

In other words, FIG. 2 shows as an alternative to the invention a further possibility for obtaining a reference measurement, which results when the web width or the width of the object to be measured 20, respectively, is lower than the detection range of used light-slit apparatuses. In this case, reference objects 40a and 40b can be arranged on the right and left side of the web material 20, for example, in the form of sheet metal strips of known thickness at a known angle (horizontally, as shown in FIG. 2). By comparing the thickness of these sheet metal strips determined by the measurement with the light-slit measurement heads, correction values can be determined, which are used for correcting the measurement data for the web material. Also, possible tilting of the light-slit measuring means 26 or 28, respectively, perpendicular to an advance direction 44 can be determined and corrected by measuring the reference objects.

In a further alternative to the invention, a light strip of monochromatic light, for example, light generated by a laser, is used as a measuring light strip. For avoiding the formation of speckle patterns on the surfaces of the statistical reference objects 40a and 40b, the reference objects (sheet metals) can be moved or vibrated, respectively, so fast in vertical (or horizontal) direction that speckles are averaged out during one light-slit measurement, typically lasting several hundred microseconds. Since for evaluating or considering, respectively, the thickness and for calculating the reference distance merely the difference of the distance from the upper and lower sides of the web material to the respective light-slit measuring means or the respective measurement head, respectively, is used, the vertical position of the comparative sheet metals is insignificant. If the sheet metal has the same thickness at every position, the same applies for the horizontal position, which allows the suppression of speckle patterns in a simple manner according to the invention. This has the great advantage that laser light can be used, which allows, due to its low divergence, the formation of "thinner" measuring light strips. This additionally increases the obtainable spatial resolution of the method.

As an alternative to the usage of laser light, a white light source can be used for projecting a light line, wherein the reference objects can then be arranged in a static manner.

If light-slit measuring means are used, the advance velocity of the object 20 in the advance direction 44 can be selected extremely high, since light-slit measuring means allow for high measurement frequencies. Thereby, the throughput is greatly increased. Additionally, a high advance velocity in the advanced direction 44 avoids the formation of speckle patterns on the surface of the object, since the same are then averaged out during the measurement period of a measurement phase of the light-slit measuring means. The high possible measurement frequency of light-slit measurement methods allows to project light measuring strips by laser, and to utilize a resulting increase of the spatial resolution.

Additionally, by averaging the measurement signal across several traces of the sensor and by temporally filtering the measurement data, a further improvement of the accuracy of the thickness determination can be obtained when light-slit measuring apparatuses are used. This is possible, since light-slit sensors allow a resolution of 1 mm perpendicular to the advance direction even with 1.5 m width of the light-slit measuring strip, and the measurement frequency of light-slit sensors is significantly higher than the typically required time resolution.

Figure 3A:
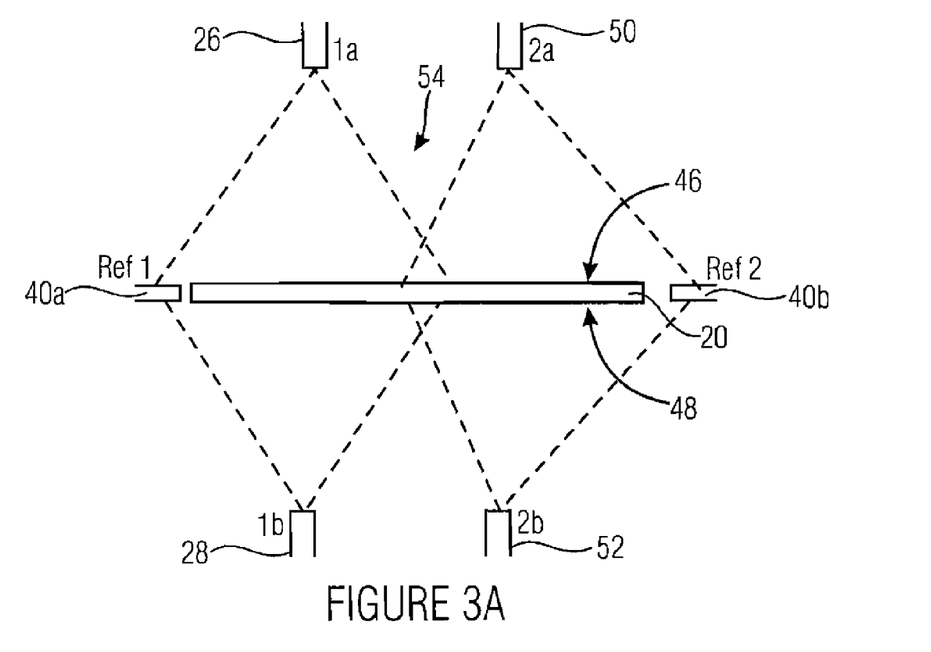
FIG. 3A are a further alternative to and 3B the invention with several light-slit measuring means.
Figure 3B:
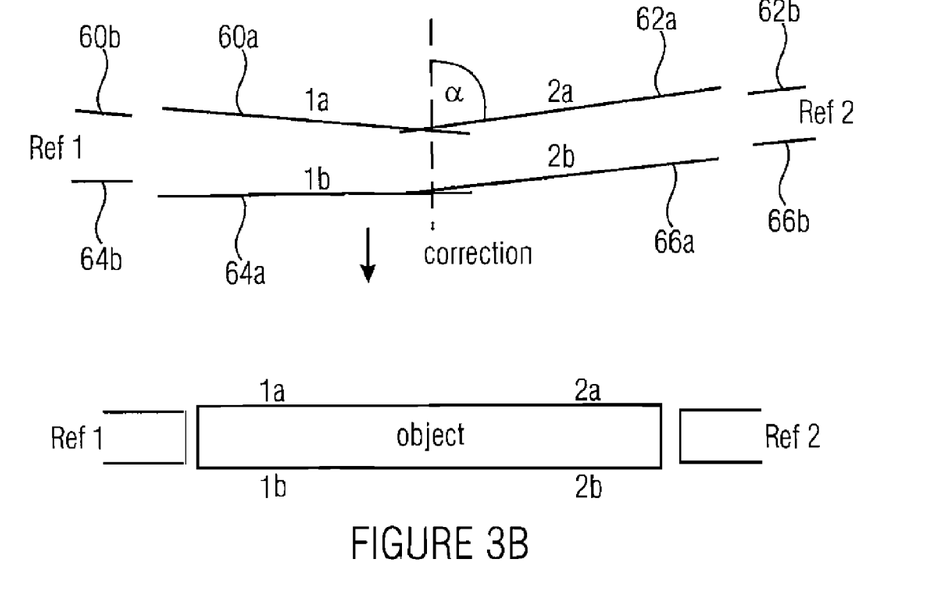

FIGS. 3A and 3B show further alternatives to the invention where the object 20 is spatially extended such that two light-slit measuring means are required per side of the object for determining distance information across the whole width of the object. Thus, in addition to the light-slit measuring means 26 facing a first main surface 46 of the object 20 and the second light-slit measuring means 28 associated with a second main surface 24 of the object 20, a third light-slit measuring means 50 (2a) and a fourth light-slit measuring means 52 (2b) are provided. Here, the third light-slit measuring means 50 is facing the first main surface 46, and the fourth light-slit measuring means 52 is facing the second main surface 48. The light planes of the first light-slit measuring means 26 and the third light-slit measuring means 50 are determined by the geometry of the arrangement such that the same intersect in a central overlapping area 54. Additionally, the first light-slit measuring means 26 generates a measuring light-strip on the surface of the first reference object 40a, and the third light-slit measuring means 50 generates a measuring light strip on the surface of the second reference object 40b. The same applies in a mirror-inverted manner for the second light-slit measuring means 28 and the fourth light-slit measuring means 52. The light planes of the second light-slit measuring means 28 and the fourth light-slit measuring means 52 also overlap within the central area 54, the second light-slit measuring means 28 generates a measuring light strip on the first reference object 40a, and the fourth light-slit measuring means 52 generates a measuring light strip on the second reference object 40b.

For example, different light wavelengths with corresponding wavelength filters can be used for distinguishing between the different measuring light strips in the overlapping area, which is monitored simultaneously by two light-slit measuring means. Basically, other methods are possible, for example, fine structuring of the different measuring light strips, for example, by interrupting the measuring light strip in certain intervals so that identification can be obtained through this pattern.

As will be described again below, by using the concept it is also possible to determine the thickness of objects, which have a geometrical extension that exceeds the width maximally accessible with a single light-slit measuring means. Based on FIG. 3B, it is illustrated exemplarily how the thickness of the object 20 can be determined across the whole width of the same from the data of the four light-slit measuring means shown in FIG. 3A. Here, in FIG. 3B, first, for the simplified case of a perfectly planar surface, the pick-ups of the light measurement strips obtained by the sensors of the light-slit measuring means 26, 28, 50 and 52 are illustrated schematically. Here, the first light-slit pick-up segments 60a and 60b are associated with the first light-slit measuring means 26, light-slit pick-up segments 62a and 62b with the third light-slit measuring means 50, light-slit pick-up segments 64a and 64b with the second light-slit measuring means 28 and light-slit recording segments 66a and 66b with the fourth light-slit measuring means 52. Thus, the light-slit pick-up segments 60a, 62a, 64a and 66a are those parts of the measuring light strips that are generated on the surface of the object 20. The light-slit pick-up segments 60b, 62b, 64b and 66b symbolize those parts of the measuring light strips that are generated on the reference objects 40a and 40b.

In the case shown in FIG. 3B, the deviations that can result from the possible inclination or non-parallelism of the individual light-slit measuring means are illustrated in an exaggerated manner for making the method or concept, respectively, clearer.

In order to be able to determine the thickness across the whole width of the object 20 from the measuring light pick-ups of the individual measuring light strips shown schematically in FIG. 3B, first, possible tiltings of the individual measuring light means 26, 28, 50 or 52 are corrected, which is possible with the reference objects analogously to the case discussed in FIG. 2. Then, the results of the first light-slit measuring means 26 are synchronized with the results of the third light-slit measuring means 50, i.e. an angle α between the measuring light pick-up segment 60a and the measuring light pick-up segment 62a is varied for so long until both measuring light pick-ups 60a and 62a provide substantially identical values in the overlapping area 54. This means a possible non-parallelism of the light plane associated with the first light-slit measuring means and the light plane associated with the third light-slit measuring means is corrected. This can be performed, for example, by a least square-fit, which minimizes the square errors of the individual measurements with regard to the value of the light-slit pick-ups obtained by adaptation in the overlapping area 54. The same method is performed for the second light-slit measuring means 28 and the fourth light-slit measuring means 52, so that after adaptation of the different measurement heads, an image shown in FIG. 3B results. By determining the reference distance between the individual light-slit measuring means by using the distances measured to the reference objects 40a and 40b, the thickness of the object to be measured 20 can be determined across its overall width.

While in the alternatives to the invention the concept is illustrated in FIGS. 3A and 3B by using merely two light-slit measuring means per side of the object to be measured, examples of measuring means can also have more than two light-slit measuring means per surface. If this is required to cover the whole width of the object 20, similar steps as outlined in FIGS. 3A and 3B can be taken. In this case, in the first step, the angle error of the measurement head perpendicular to the advance direction is determined for both outer measurement arrangements that each detect a reference object located horizontally (or at a known angle). For the measurement arrangements located further to the inside, the tilting is determined successively from the outside to the inside by using the overlapping areas for adapting the measurement curves. The thickness across the whole width of the object 20 then results analogously to the above-described method by using the known thicknesses of reference objects 40a and 40b.

In summary, it can be said that even when the web width is greater than the width that can be covered by a single distance measuring means or an arrangement of one light-slit detector each respectively arranged above and below the web material or the object 20, several such arrangements can be arranged beside one another for covering a greater width. In this case, only the outer measuring means or distance measuring means, respectively, detect one reference part or reference object, respectively, each. If the measurement areas of the arrangements sufficiently overlap, relative movements and possible tiltings of the measurement heads perpendicular to the advance direction can be corrected. Since a light-slit measurement head only detects distances, tilting of a measurement head without correction would lead to incorrect thickness values. As already described above, a schematic illustration of the problem is shown, for example, in FIG. 3B. The left measurement arrangement (light-slit measuring means 26 and 28) detects the left reference part (reference object 40a), the right measurement arrangement (light-slit measuring means 50 and 52) detects the right reference part or the right reference object 40b, respectively. Possible tilting of the individual measurement heads perpendicular to the advance direction, which runs perpendicular to the illustration plane in the case shown in FIG. 3A, is determined and corrected with the help of the horizontally mounted reference objects. After correction of the angle errors, the results of the measurement heads 1a and 2a or 1b and 2b, respectively, are adapted to each other, so that both measurement heads provide mostly identical values in the overlapping area (e.g. by least-square-fit). Thereby, continuous measurement results result for the upper or lower measurement arrangement, respectively.

In a last step, the results are adapted by comparison to the known thicknesses of the reference objects. After this step, thickness values for the web material exist for every measurement point. For a simplified illustration, it is assumed in the case shown in FIGS. 3A and 3B that the object 20 or a web material to be tested, respectively, has a planar surface. Without limitation of the application of the inventive concept, according to the invention, non-planar objects can be measured as well, such as sheet metals that are curved in advance direction, or profile sheet metals that can have a triangular or square or rectangular profile, respectively.

Although FIG. 3 shows an example for usage of more than one light-slit measuring means per side of the object to be measured 20, wherein the reference distance is determined by reference objects, the concept with several light-slit measuring means is also possible in a further embodiment of the invention in connection with the radiometric sensors shown in FIG. 1 for determining the reference distance. Here, for such a radiometric reference measurement, one radiometric sensor would be required per opposing light-slit measuring means, which means for the pairs of light-slit measuring means 26 and 28 or the light-slit measuring means 50 and 52, respectively. Reference objects 40a and 40b can then be omitted. As has already been discussed based on FIG. 1, only a single radiation detector is required for determining a distance change between the two light-slit measurement heads arranged above or below the object 20 or the web material, respectively, which would cause an error in the thickness measurement.

As has already been discussed based on FIG. 1, when using such radiometric methods (radiation source and radiation detector), simultaneously, possible tilting of the light-slit measurement heads can be corrected when, for every pair of opposing light-slit measuring means, additionally, a second radiometric measuring means is used.

As in the case shown in FIG. 3A, more than two light-slit measuring means per side can be used when using radiometric detectors for determining the reference distances, wherein then each light-slit measuring means has at least one radiometric measuring means for determining the reference distance associated with the same.

Figure 4:
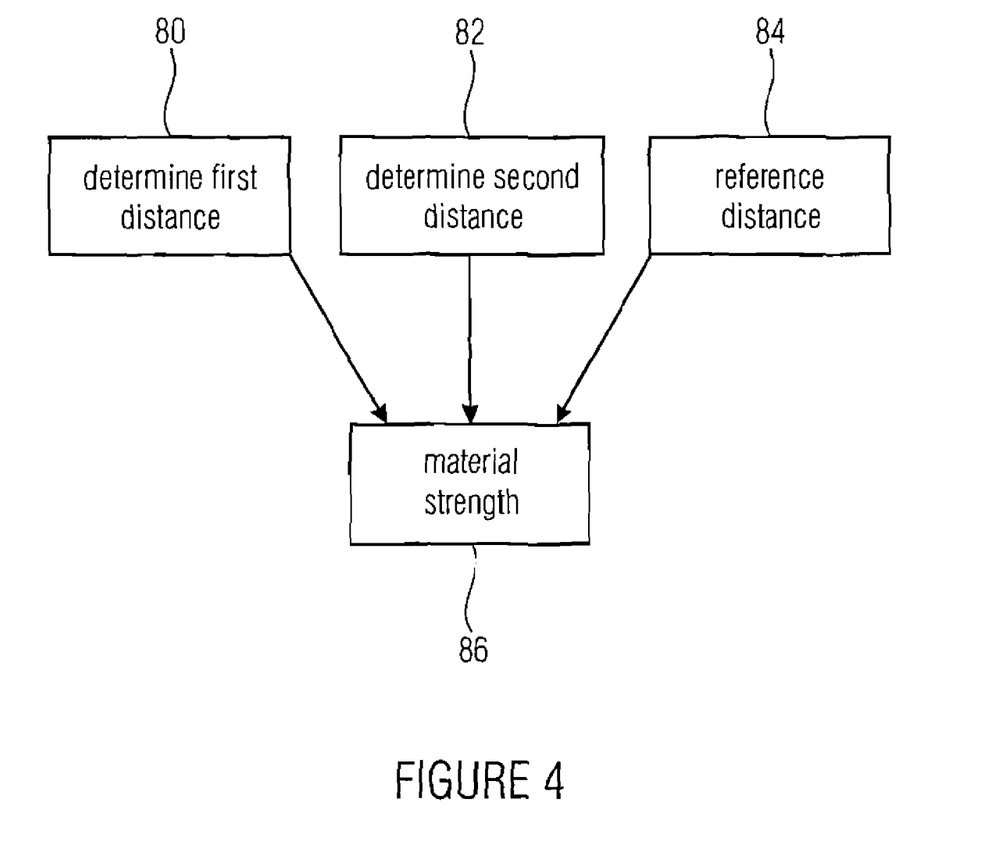
FIG. 4 is a method alternative to the invention for determining the material strength of an object.

Based on FIG. 4, an alternative to the inventive method for determining the material strength of an object is illustrated schematically in the form of a block diagram. For determining the material strength, a first distance between a distance measuring means and a first main surface of the object is determined first in a first distance measurement step 80.

In a second distance measurement step 84, a second distance between a second distance measuring means and a second main surface of the object opposing the first main surface is determined.

In a third step 84, information about a reference distance allowing a determination of a deviation of an actual distance between the first distance measuring means 26 and the second distance measuring means 28 from a set value is provided.

In an evaluation step 86, the material strength of the object is determined from the first distance, the second distance and the reference distance. The evaluation step 86 could be performed in an evaluator such as evaluator 10 shown in FIG. 1 representatively for all preferred embodiments described herein.

Other measuring means than the light-slit measurement methods described in the embodiments can be used as distance measuring means. Here, for example, run time methods, such as ultrasound echo methods or radar echo methods can be taken into consideration that can use, for example, interferences of the reflected and emitted signals for obtaining precise distance information. Although reference objects with cuboid-shaped geometry are shown in FIGS. 2 and 3A or 3B, respectively, according to the invention, reference objects of any other geometries can be used. In a further comparative example, a reference object in the form of a rotating circular disc is used. Thus, on the one hand, it is obtained that no speckle patterns that decrease the measurement accuracy are formed when using lasers. On the other hand, possible non-planarities in the surface of the circular object that can be caused during production are averaged out by the rotation, so that, overall, the measurement accuracy can be further increased.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A measuring apparatus for determining the material strength of an object, comprising:
    a first distance measurer including a first light-slit measurer arranged to determine a first distance profile between the first light-slit measurer and a first main surface of the object facing the first light-slit measurer in a measurement direction along a first measuring light strip on the first main surface of the object extending in a light strip direction;
    a second distance measurer including a second light-slit measurer arranged to determine a second distance profile between the second light-slit measurer and a second main surface of the object opposing the first main surface of the object in the measurement direction along a second measuring light strip on the second main surface of the object extending in the light strip direction;
    a first X-ray unit arranged in a spatially stationary orientation and a known geometrical position with regard to the first and the second light-slit measurers to infer a first material strength of the object along a first X-ray direction from an attenuation of X-ray radiation caused by the object along the first X-ray direction;
    a second X-ray unit connected to the first and the second light-slit measurers and arranged in a further spatially stationary orientation, spatially separated from the first X-ray unit along the light strip direction, to infer a second material strength of the object along a second X-ray direction from an attenuation of X-ray radiation caused by the object along the second X-ray direction; and
    an evaluator arranged to determine the material strength of the object between the first main surface and the second main surface by using the first distance profile, the second distance profile, and the first material strength, wherein the evaluator is implemented to infer a tilting between the first and the second light-slit measurers in a plane spanned by the light strip direction and the measuring direction from the first and second material strengths.

2. The measuring apparatus according to claim 1, wherein the measurement direction is perpendicular to the first main surface of the object.

3. The measuring apparatus according to claim 1, wherein the first X-ray unit is implemented to determine the first material strength for a surface area less extended than a surface area of the first and second light-slit measurers in the measurement direction.

4. The measuring apparatus according to claim 1, wherein the first and second X-ray units are arranged with regard to the first and the second light-slit measurers such that the X-ray direction extends parallel to the measurement direction.

5. The measuring apparatus according to claim 1, wherein the first and second light-slit measurers each include one laser.

6. The measuring apparatus according to claim 1, wherein the first and second light-slit measurers each include one white light source.

7. The apparatus according to claim 1, wherein the first and second light slit measurers are arranged such that the first measuring light strip and the second measuring light strip oppose on the first and second main surfaces of the object.

8. The measuring apparatus according to claim 1, wherein the first distance measurer comprises a third light-slit measurer comprising a third generator arranged to generate a third measuring light strip on the first main surface of the object; and the second distance measurer comprises a fourth light-slit measurer comprising a fourth generator arranged to generate a fourth measuring light strip on the second main surface of the object, wherein measuring light strips generated by the first generator and by the third generator spatially overlap in an overlapping area on the first main surface of the object, and wherein measuring light strips generated by the second generator and by the fourth generator spatially overlap in an overlapping area on the second main surface of the object.

9. The measuring apparatus according to claim 8, wherein the evaluator is implemented to adapt distance profiles of the first and third light-slit measurer in the overlapping area to each other to acquire adapted distance information, so that the first and third light-slit measurers show a deviation from the adapted distance profiles in the overlapping area that lies within a predetermined tolerance range.

10. A method for determining the material strength of an object, comprising:

determining, by use of a first light-slit measurer, a first distance profile between the first light-slit measurer and a first main surface of the object which is arranged to face the first light-slit measurer in a measurement direction along a first measuring light strip on the first main surface of the object extending in a light strip direction;

determining, by use of a second light-slit measurer, a second distance profile between the second light-slit measurer and a second main surface of the object opposing the first main surface of the object in the measurement direction along a second measuring light strip on the second main surface of the object extending in the light strip direction;

determining a first material strength of the object from an attenuation of X-ray radiation in a first X-ray direction caused along the first X-ray direction by the object at a first position;

determining a second material strength of the object from an attenuation of X-ray radiation in a second X-ray direction differing from the first X-ray direction caused along the second X-ray direction by the object at a second position separated from the first position along the light strip direction;

determining a tilting between the first and the second light-slit measurers in a plane spanned by the light strip direction and the measuring direction from the first and second material strengths; and determining the material strength of the object in measurement direction between the first main surface and the second main surface by using the first distance profile, the second distance profile, and the determined tilting between the first and the second light-slit measurers.

11. A measuring apparatus for determining the material strength of an object, comprising:

a first distance measurer arranged to determine a first distance between the first distance measurer and a first main surface of the object facing the first distance measurer in a measurement direction;

a second distance measurer arranged to determine a second distance between the second distance measurer and a second main surface of the object opposing the first main surface of the object in the measurement direction;

an X-ray unit arranged in a spatially stationary orientation with regard to the first and the second distance measurers to infer a first material strength of the object along an X-ray direction from an attenuation of X-ray radiation caused by the object along the X-ray direction; and an evaluator arranged to determine the material strength of the object between the first main surface and the second main surface by using the first distance, the second distance and the first material strength; wherein the first distance measurer includes a first light-slit measurer including a first light strip generator arranged to generate a first measuring light strip on the first main surface of the object, and the second distance measurer includes a second light-slit measurer including a second light strip generator arranged to generate a second measuring light strip on the second main surface of the object; and the first light strip generator and the second light strip generator are arranged such that the first measuring light strip and the second measuring light strip oppose on the opposing first and second main surfaces of the object, so that the first and second distance measurers obtain the first and second distances along the opposing first and second measurement light strips, wherein the X-ray unit is configured to infer the first material strength for a position on the opposing main surfaces of the object.

12. A method for determining the material strength of an object, comprising:

determining a first distance between a first distance measurer and a first main surface of the object facing the first distance measurer in a measurement direction;

determining a second distance between a second distance measurer and a second main surface of the object opposing the first main surface in the measurement direction;

determining a first material strength of the object from an attenuation of X-ray radiation in an X-ray direction caused along the X-ray direction by the object; and determining the material strength of the object in the measurement direction between the first main surface and the second main surface by using the first distance, the second distance and the first material strength; wherein the first distance measurer includes a first light-slit measurer including a first light strip generator arranged to generate a first measuring light strip on the first main surface of the object, and the second distance measurer includes a second light-slit measurer including a second light strip generator arranged to generate a second measuring light strip on the second main surface of the object;

the first light strip generator and the second light strip generator are arranged such that the first measuring light strip and the second measuring light strip oppose on opposing main surfaces of the object, so that, in the determination of the first and second distances, the first and second distances are obtained along the opposing first and second measurement light strips, wherein the determination of the first material strength is determined at a position on the opposing main surfaces of the object, respectively.

* * * * *